United States Patent
Kawato et al.

(10) Patent No.: US 7,832,916 B2
(45) Date of Patent: Nov. 16, 2010

(54) BACK CHASSIS INTEGRATING REFLECTOR, BACK LIGHT AND LIQUID CRYSTAL DISPLAY

(75) Inventors: Hiroshi Kawato, Ichihara (JP); Masami Kogure, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 338 days.

(21) Appl. No.: 11/629,514

(22) PCT Filed: Jun. 10, 2005

(86) PCT No.: PCT/JP2005/010669

§ 371 (c)(1),
(2), (4) Date: Dec. 14, 2006

(87) PCT Pub. No.: WO2005/124401

PCT Pub. Date: Dec. 29, 2005

(65) Prior Publication Data

US 2007/0229995 A1    Oct. 4, 2007

(30) Foreign Application Priority Data

Jun. 21, 2004  (JP) ............................. 2004-182069
Oct. 15, 2004  (JP) ............................. 2004-301583

(51) Int. Cl.
*F21V 7/04* (2006.01)
(52) U.S. Cl. ................. 362/633; 362/632; 362/634
(58) Field of Classification Search .......... 362/600–634
See application file for complete search history.

(56) References Cited

U.S. PATENT DOCUMENTS 6,971,780  B2 *  12/2005  Lee et al. ................. 362/561
2001/0019378  A1 *  9/2001  Yamaguchi ................ 349/61

(Continued)

FOREIGN PATENT DOCUMENTS

EP           1 553 431 A1      7/2005

(Continued)

OTHER PUBLICATIONS

H. Kawahigashi, et al. A Light Reflector, Useful for a Reflecting Plate or a Reflecting Frame for Liquid Crystal Black Light, Comprises a Polycarbonate Resin Composition and has Uniform Brightness, Derwent/WPI, XP002466259, Jan. 1, 1990, 1 Page.

*Primary Examiner*—Sandra L O'Shea
*Assistant Examiner*—William J Carter
(74) *Attorney, Agent, or Firm*—Oblon, Spivak, McClelland, Maier & Neustadt, L.L.P.

(57) ABSTRACT

A modularized reflector is produced by integrating or laminating: a sheet metal back chassis in which a light source supporting section, a through-hole or a groove for extracting a light source electrode terminal, and a frame for supporting a light diffusing plate and an optical film are integrally formed through sheet metal working; and a light reflecting layer made of a molded product of a light reflective thermoplastic resin material formed into a shape for covering the back chassis. By producing a backlight device and a liquid crystal display using the reflector, there are provided the reflector reduced in the number of components, in the number of assembly steps, and in weight and thickness, and a back light and a liquid crystal display using the reflector.

14 Claims, 5 Drawing Sheets

U.S. PATENT DOCUMENTS

| | | | |
|---|---|---|---|
| 2004/0051429 A1* | 3/2004 | Hayashi et al. | 313/11 |
| 2005/0131121 A1* | 6/2005 | Tsutsumi et al. | 524/413 |
| 2005/0140895 A1* | 6/2005 | Watson et al. | 349/141 |
| 2006/0047037 A1 | 3/2006 | Kawato et al. | |
| 2006/0055839 A1* | 3/2006 | Hirao et al. | 349/58 |

FOREIGN PATENT DOCUMENTS

| | | |
|---|---|---|
| JP | 04-033204 | 2/1992 |
| JP | 4-79330 | 7/1992 |
| JP | 07-270786 | 10/1995 |
| JP | 09-292533 | 11/1997 |
| JP | 10-326517 | 12/1998 |
| JP | 2925745 | 5/1999 |
| JP | 2002-019065 | 1/2002 |
| JP | 2002-72204 | 3/2002 |
| JP | 2002-268573 | 9/2002 |
| JP | 2004-091567 | 3/2004 |
| JP | 2004-127643 | 4/2004 |
| WO | WO 2004/020522 A1 | 3/2004 |
| WO | WO 2004/036241 A1 | 4/2004 |

* cited by examiner

[Fig. 1]
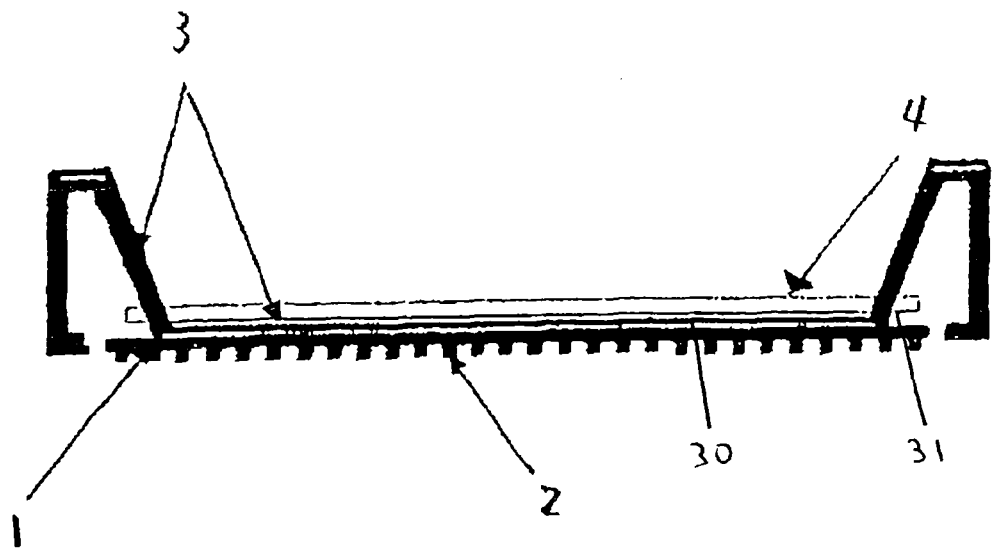
[Fig. 2]
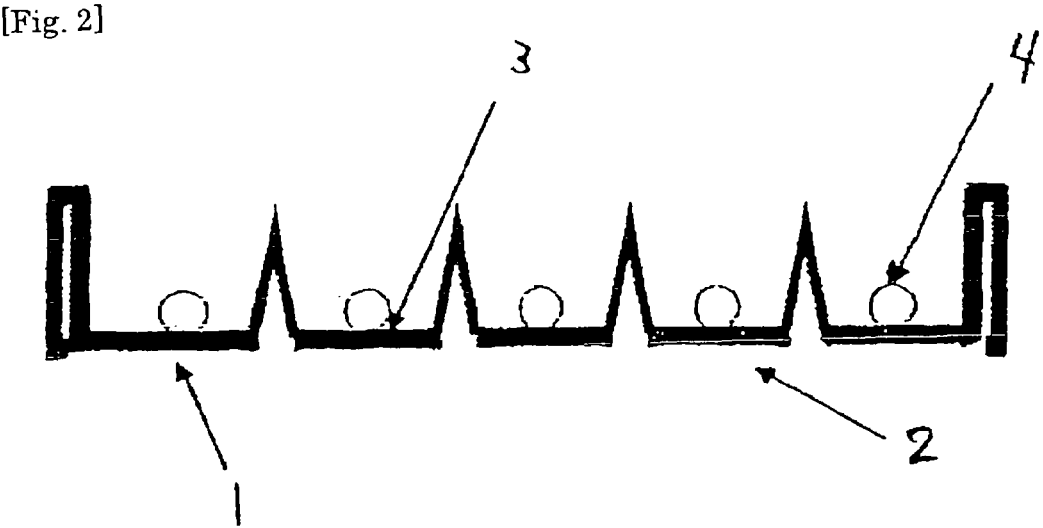
[Fig. 3]
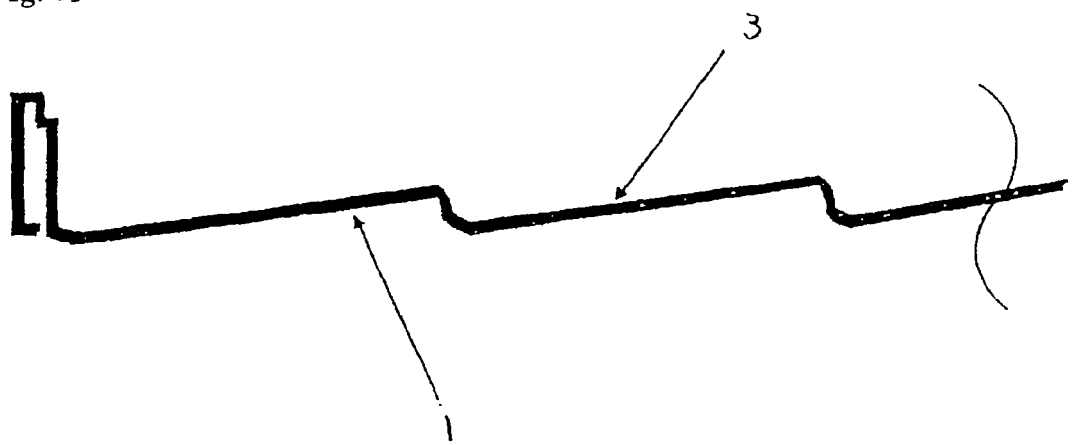

[Fig. 4]
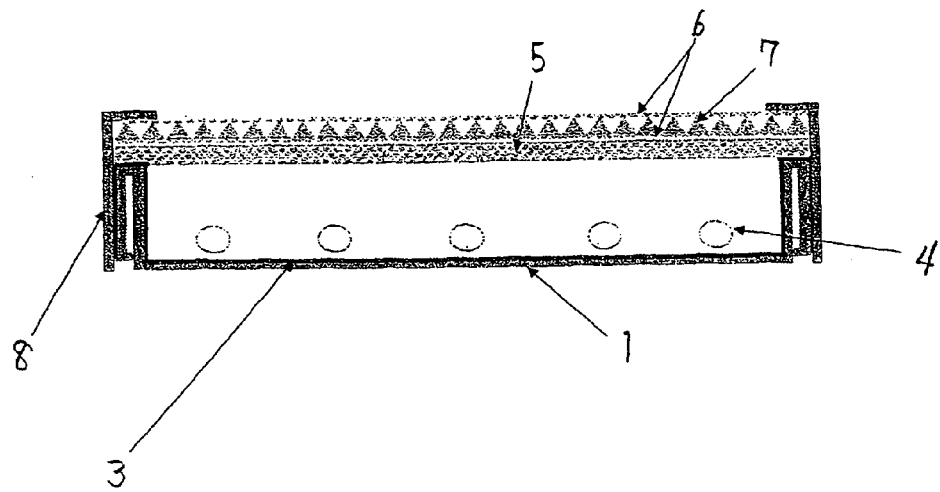
[Fig. 5]
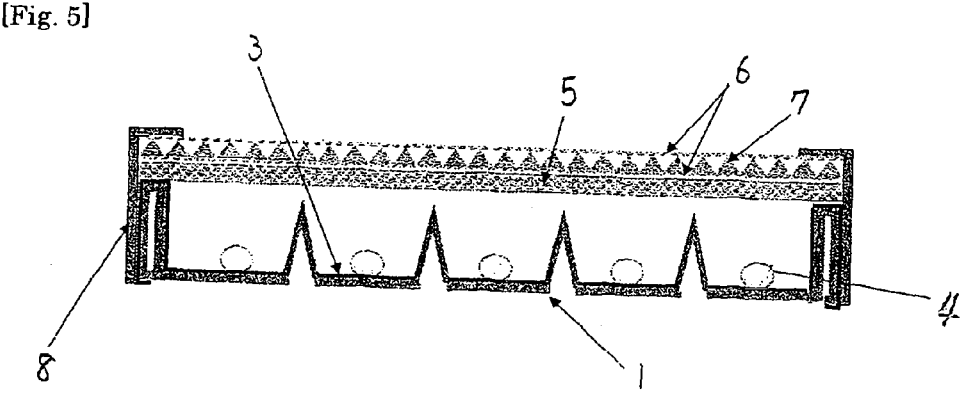
[Fig. 6]
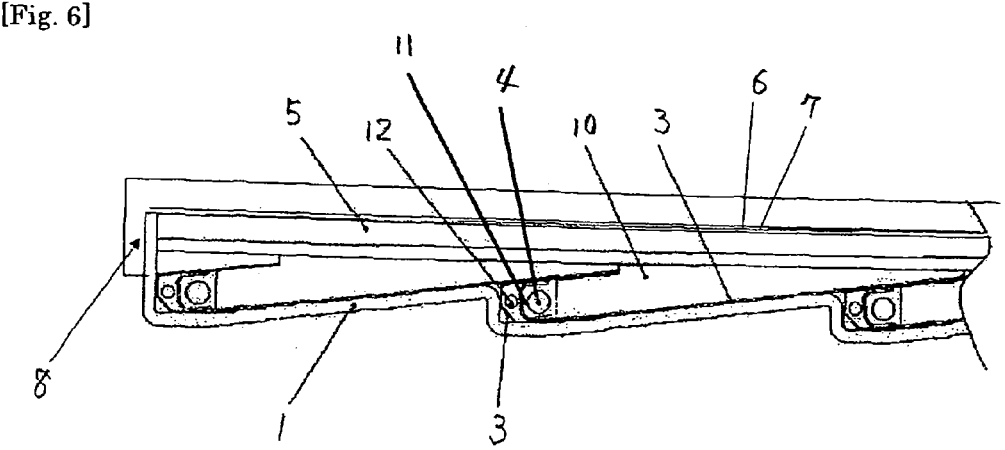

[Fig. 7]
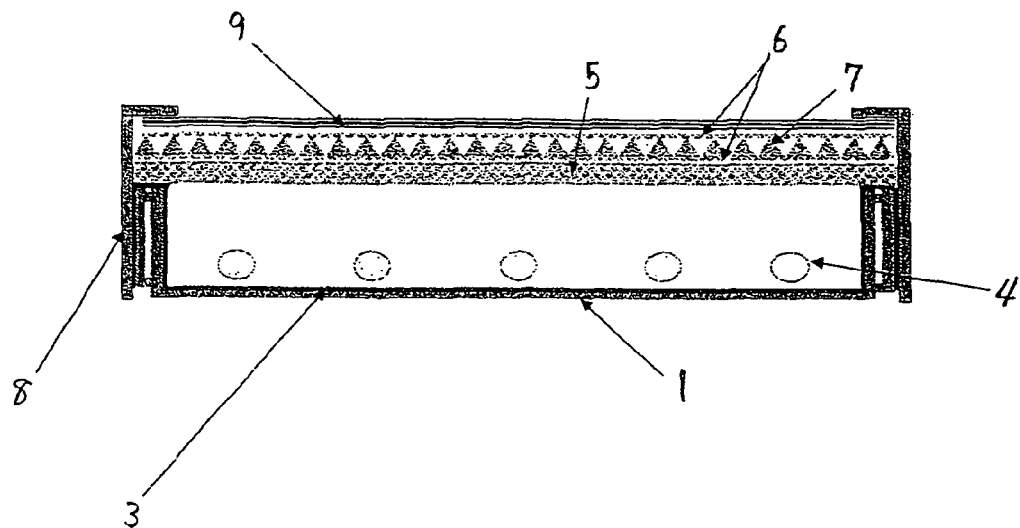
[Fig. 8]
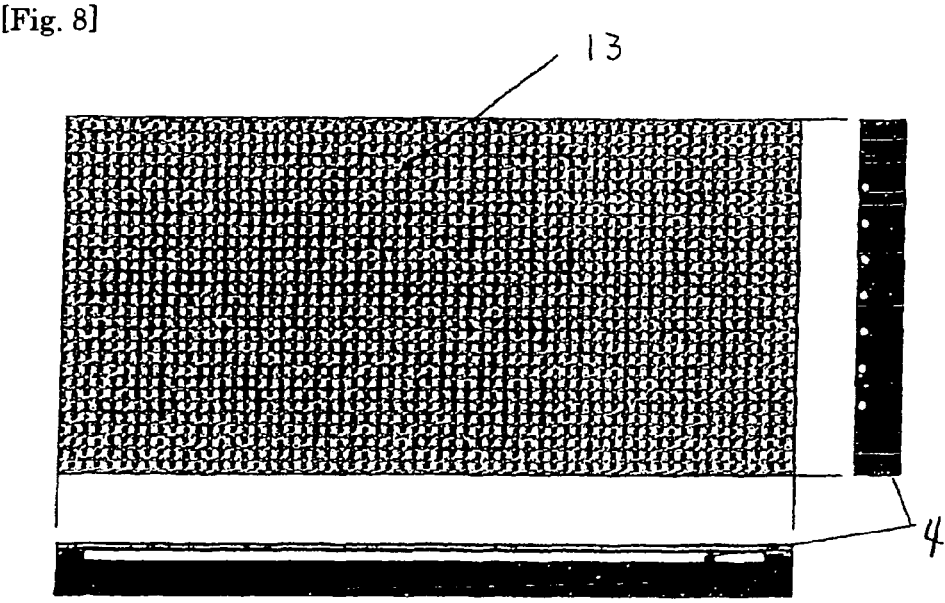

[Fig. 9]
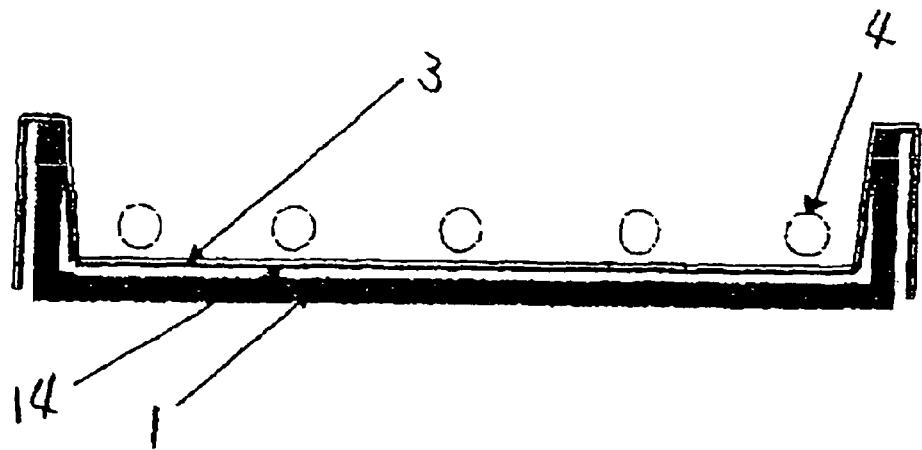
[Fig. 10]
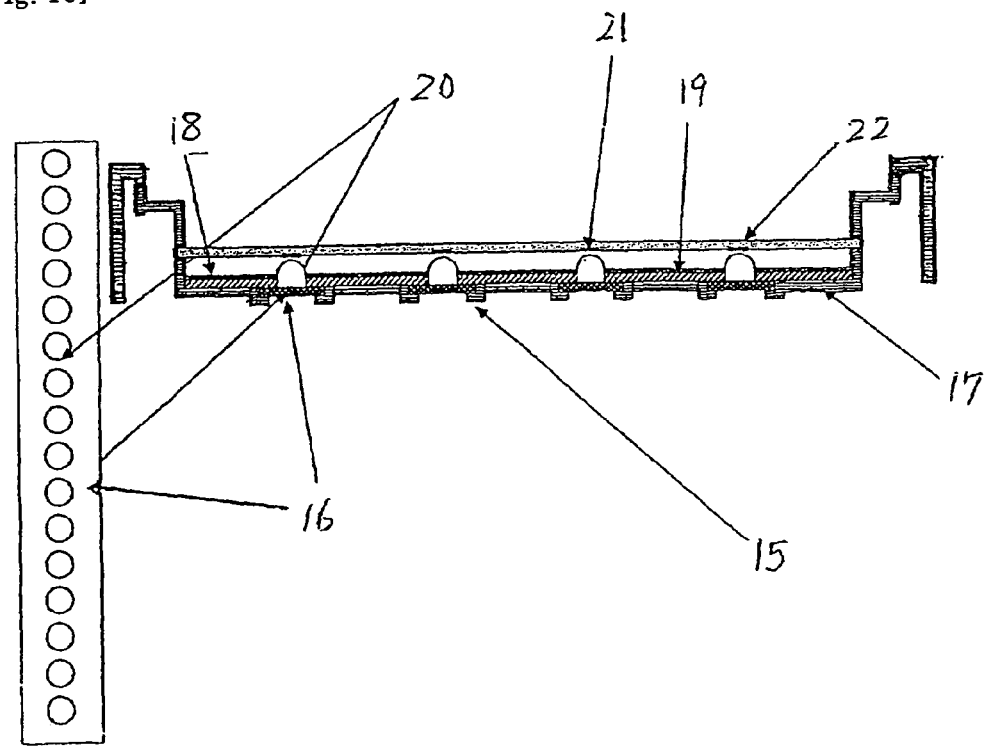

[Fig. 11]
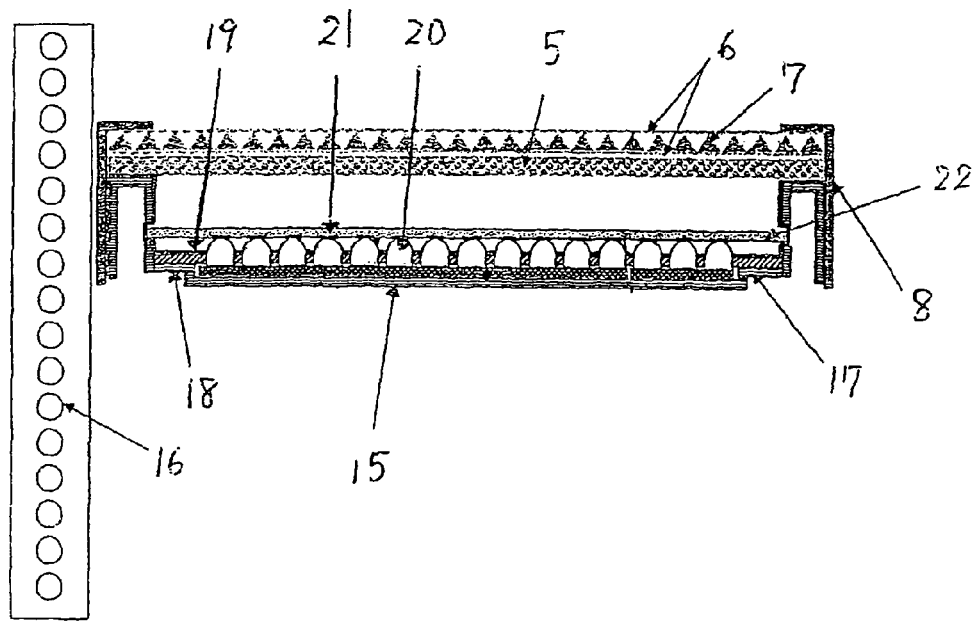
[Fig. 12]
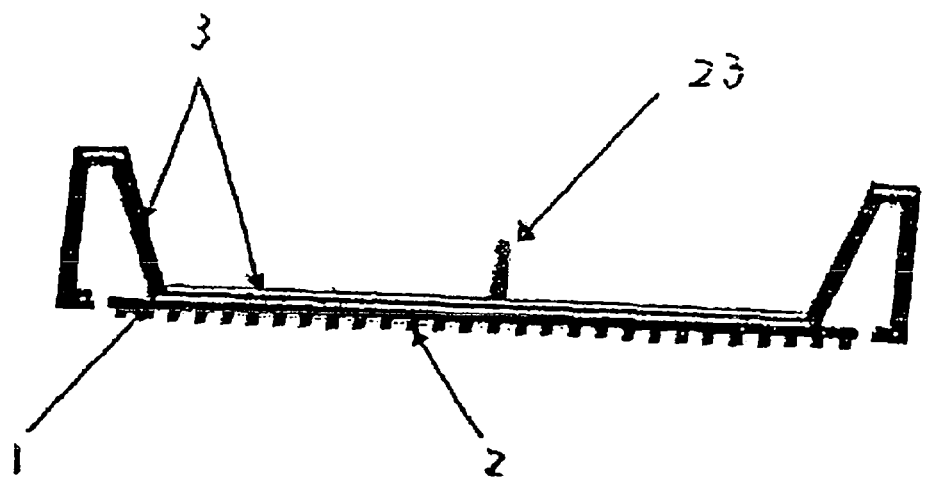
[Fig. 13]
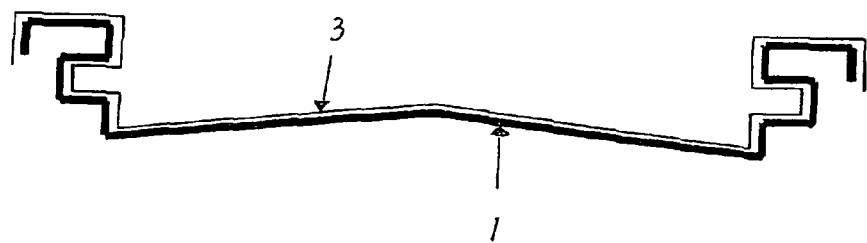

BACK CHASSIS INTEGRATING REFLECTOR, BACK LIGHT AND LIQUID CRYSTAL DISPLAY

TECHNICAL FIELD

The present invention relates to a back chassis integrating reflector to be used for a backlight device or a liquid crystal display, to a backlight device using the same, and to a liquid crystal display using the same.

BACKGROUND ART

A liquid crystal display generally includes a backlight device and a liquid crystal panel. The backlight device is constructed of a sheet metal back chassis, a sheet metal front chassis, a light reflecting plate, a light source supporting section, a light source, a light diffusing plate, a light guide plate used as required, and a light source drive circuit such as an inverter. The liquid crystal display has a structure in which a liquid crystal panel is arranged and fixed on the backlight device. The backlight device is roughly classified into three types of a direct type, a light guide-type, and a tandem-type which is a hybrid of the two types. Of those, a backlight device to be used for a large screen liquid crystal TV requires high brightness, and thus a direct type- or tandem (hybrid) type-backlight device has recently been developed actively.

Structure of a Direct Type-Backlight Device

A conventional direct type-backlight device is constructed of a flat or corrugated light reflecting plate formed by bonding and laminating a resin foam on an aluminum sheet metal substrate, a plurality of light sources, a light source support, a light diffusing plate, a plurality of optical films, sheet metal chassis (a back chassis and a front chassis), and the like (see Patent Documents 1 to 3, for example).

Structure of a Tandem (Hybrid) Type-Backlight Device

A conventional tandem type-backlight device is constructed of a light reflecting plate formed by bonding and laminating a resin foam on a wedged aluminum sheet metal substrate or a plurality of light reflecting sheets, a plurality of light sources, a light source support, a light diffusing plate, a plurality of light guide plates, a plurality of optical films, sheet metal chassis (a wedged back chassis and a front chassis), and a light source electrode terminal cover as required (see Patent Documents 4 and 5, for example).

A conventional liquid crystal display is constructed by arranging a liquid crystal panel on the backlight device.

A reflecting plate to be used is obtained by bonding and laminating a resin foam on an aluminum sheet metal substrate as shown in FIG. 9 for preventing warping and deformation of the reflecting plate and maintaining a structure thereof. In general, a reflector is produced through sheet metal working such as press working for a corrugated shape or folding for forming a side surface.

A plurality of light sources is used in accordance with a display screen size of a liquid crystal display and brightness required for a backlight device. A point light source such as a linear or U-shaped cold cathode tube (CCFL) or an optical semiconductor device (LED), or a light source including linearly or flatly arranged point light sources is used as the light source.

A light source support is not formed of a sheet metal, and an injection molded product of a thermoplastic resin composition is often used. In particular, a light source support molded by using a polycarbonate resin composition containing titanium oxide has a light reflecting function, and a light source support having a structure in which a rib structure is formed outside of the light supporting function for improving torsional rigidity of the light reflecting plate is employed.

A light diffusing plate is generally obtained by using an acrylic resin, an acrylic monomer/styrene copolymer resin, or a polycarbonate resin. In these days, a light diffusing plate is obtained by using a resin composition containing a light diffusing agent mixed into a transparent resin such as a cyclic olefin resin. The light diffusing plate has a thickness of about 1 to 3 mm and is selected in accordance with a liquid crystal display screen size or a lighting system.

In addition, not only a light source supporting section but also a light diffusing plate supporting frame may employ a frame having a rib structure formed of an injection molded product of a polycarbonate-based resin composition containing titanium oxide.

An optical film having a plurality of functions is laminated. In general, a light diffusing film to be used for providing uniform surface brightness of a backlight device or a prism sheet having a brightness enhancing function is used. A plurality of those optical films is laminated and used for adjusting the brightness and uniformity of the brightness.

A light guide plate is generally obtained by using an acrylic resin or a polycarbonate resin. In these days, a light guide plate is obtained by using a transparent resin having high light guide property such as a cyclic olefin resin, and is selected in accordance with a use environment or a screen size. The light guide plate has scattering patterns or fine irregularities on a back surface of the light guide plate which are formed with light diffusing white ink or the like, and is a light transforming element for uniform and efficient surface emission of light entered from a linear light source or a point light source in a light exiting direction.

Those conventional backlight devices each have a large number of components and many assembly steps. Further, sheet metal working is conducted twice for producing a reflector by corrugating the light reflecting plate or folding for forming a side surface of the light reflecting plate, and for producing a chassis (casing). Thus, assembly of the backlight device requires double steps, and increase in weight of an entire device is inevitable. In the light reflecting plate obtained by bonding and laminating a resin foam on an aluminum sheet metal substrate, a resin foamed layer is liable to peel off from the aluminum sheet metal substrate during sheet metal working and position shift may be caused. Thus, sheet metal working of a complex shape involves difficulties. The aluminum sheet metal substrate to be used herein is formed of aluminum or aluminum alloy. However, an easily available and relatively inexpensive aluminum material of 52S cannot be used for imparting sheet metal working properties, and an expensive material must be used. As described above, sheet metal working of a complex shape involves difficulties, and thus a reflector must be produced by: producing a light source support having a structure for preventing torsion and reinforcing a light reflecting plate and having functions of supporting a light source, supporting a reflecting section, insulating heat of a light source electrode terminal, and the like by using a resin composition by a separate injection molding method and attaching and fixing the light source support after the light source is provided to the light reflecting plate. In the case where the aluminum sheet metal is used, a thickness of a chassis is 1 mm with a display screen size of 22 inches, 1.5 mm with a display screen size of 30 inches, and 2 mm with a display screen size of 40 inches, which also causes weight increase (see Patent Documents 6 and 7, for example).

There is proposed a sheet metal substrate provided with a coat having light reflecting property on a sheet metal substrate for a light reflecting plate in advance. However, the sheet metal substrate is applied to the light reflecting plate alone, and no reflector having a structure provided with a back chassis and/or a light source support is proposed. Thus, a light source support produced by the separate injection molding method must be applied to a light source supporting section as described above.

Meanwhile, in the case where a light reflecting plate is formed by using a polycarbonate-based thermoplastic resin composition containing titanium oxide and having a light reflecting function without using the aluminum substrate, suppression of warping and deformation caused by thermal expansion with temperature increase by heat from a light source involves difficulties.

Further, for formation of a chassis for supporting a liquid crystal panel as required, rigidity is hardly ensured (see Patent Documents 8 and 9, for example).

There are proposed methods of improving a structure of a light source electrode terminal, which is a source of heat generation, and enhancing heat radiation property, but the methods do not reduce the number of components (see Patent Documents 10 to 12, for example).

Patent Document 1: JP-A-2004-22352
Patent Document 2: JP-A-2004-127643
Patent Document 3: JP-A-2001-215497
Patent Document 4: JP-A-2003-346537
Patent Document 5: JP-A-2002-72204
Patent Document 6: JP-A-2004-55182
Patent Document 7: JP-A-2004-139871
Patent Document 8: JP-A-2004-102119
Patent Document 9: JP-A-2003-162901
Patent Document 10: JP-A-2004-134281
Patent Document 11: JP-A-2001-216807
Patent Document 12: JP-A-2003-234012

DISCLOSURE OF THE INVENTION

An object of the present invention is to provide a reflector having a reduced number of components, a reduced number of assembly steps, and reduced weight and thickness, a backlight device using the same, and a liquid crystal display using the same.

For attaining the above-mentioned object, a reflector of the present invention is modularized by integrating or laminating a sheet metal back chassis where a light source supporting section, a through-hole or groove for extracting a light source electrode terminal, and a frame for supporting a light diffusing plate and an optical film are integrally formed through sheet metal working and a light reflecting layer formed of a molded product of a light reflective thermoplastic resin material formed into a shape for covering the back chassis. The object of the present invention can be attained by producing a reflector having such the structure and provided with a back chassis function, and employing the reflector for a direct type- or tandem (hybrid) type-backlight device.

A reflector provided with the chassis function having sufficient strength and rigidity for supporting a liquid crystal panel can be realized by integrating or laminating: a sheet metal back chassis in which a light source supporting section, a through-hole or groove for extracting a light source electrode terminal, a frame for supporting a light diffusing plate and a plurality of optical films, and a light diffusing plate support as required are integrally formed through sheet metal working and a light reflecting layer formed of a molded product of a light reflective thermoplastic resin material formed into a shape for covering the sheet metal back chassis. Thus, a backlight device and a liquid crystal display each having a reduced number of components, a reduced number of assembly steps, and reduced weight and thickness can be obtained.

BRIEF DESCRIPTION OF THE DRAWINGS

[FIG. 1] A side view of an example of a reflector having a reinforcing rib on a back surface thereof, and having a light source supporting section, a through-hole or groove for extracting a light source electrode terminal, and a frame for supporting a light diffusing plate, a plurality of optical films, and the like integrally formed.

[FIG. 2] A sectional view of an example of a reflector having a reinforcing rib on a back surface thereof, having a corrugated reflecting surface, and having a light source supporting section, a through-hole or groove for extracting a light source electrode terminal, and a frame for supporting a light diffusing plate, a plurality of optical films, and the like integrally formed.

[FIG. 3] A side view of an example of a tandem-type back chassis integrating reflector.

[FIG. 4] A section of an example of a backlight device employing the reflector described in FIG. 1.

[FIG. 5] A section of an example of a backlight device employing the reflector described in FIG. 2.

[FIG. 6] A side view of an example of a tandem-type backlight device employing the reflector described in FIG. 3.

[FIG. 7] A section of an example of a liquid crystal display employing the backlight device described in FIG. 4.

[FIG. 8] A back surface view of a direct type-reflector having a lattice-like or a corrugated rib structure serving as a rigidity reinforcer and/or heat dissipation fin on a back surface of the reflector on a bottom surface of the direct type-reflector.

[FIG. 9] A section of an example of a conventional direct type-reflector.

[FIG. 10] A section of an example of a direct type-reflector employing a light emitting device (LED) as a light source.

[FIG. 11] A side view of an example of a backlight device including a direct type-reflector employing a light emitting device (LED) as a light source.

[FIG. 12] A side view of an example of a reflector having a reinforcing rib on a back surface, and having a light source supporting section, a through-hole or groove for extracting a light source electrode terminal, and a light diffusing plate support, and a frame for supporting a plurality of optical films and the like integrally formed.

[FIG. 13] A side view of an example of a reflector for a side light type-backlight device employing a light emitting device (LED) as a light source.

DESCRIPTION OF REFERENCE NUMERALS

1: ALUMINUM SHEET METAL BACK CHASSIS
2: REINFORCING RIB
3: LIGHT REFLECTING SHEET
4: LIGHT SOURCE
5: LIGHT DIFFUSING PLATE
6: LIGHT DIFFUSING FILMS
7: PRISM SHEET
8: FRONT CHASSIS
9: LIQUID CRYSTAL PANEL
10: LIGHT GUIDE PLATE
11: METAL REFLECTING PLATE OR DEPOSITED FILM
12: LEAD-OUT WIRE

13: LATTICE-LIKE OR CORRUGATED RIB STRUCTURE
14: ALUMINUM SUBSTRATE FOR REFLECTING PLATE
15: SUPPORT FOR LIGHT EMITTING DEVICE (LED) ARRAY SUBSTRATE
16: LIGHT EMITTING DEVICE (LED) ARRAY SUBSTRATE
17: BACK CHASSIS
18: SHEET METAL SUBSTRATE FOR SUPPORTING LIGHT REFLECTING LAYER
19: LIGHT REFLECTING LAYER
20: LIGHT EMITTING DEVICE (LED) LIGHT SOURCE
21: LIGHT SHIELDING LAYER
22: TRANSPARENT PLATE
23: LIGHT DIFFUSING PLATE SUPPORT

Best Mode For Carrying Out The Invention

An invention according to an embodiment relates to a reflector having a back chassis function produced by: integrally forming a light source supporting section, a through-hole or groove for extracting a light source electrode terminal, a frame for supporting a light diffusing plate and a plurality of optical films, and the like, and a light diffusing plate support as required on a sheet metal back chassis through sheet metal working; and integrating or laminating the sheet metal back chassis, and a light reflecting layer made of a light reflective thermoplastic resin material formed into a shape for covering the sheet metal back chassis or a light reflecting plate for modularization.

The light source supporting section and the through-hole for extracting a light source electrode terminal and a lead-out wire are formed on the sheet metal back chassis through sheet metal working. Thus, a light source support component does not need to be separately produced and attached, and a vicinity of the light source electrode terminal as a source of heat generation may be removed from a lamp room, to thereby prevent temperature increase in the lamp room. In the case where a point light source such as an optical semiconductor device (LED), or a light source including linearly or flatly arranged point light sources is used as a light source, the light source supporting section includes a substrate supporting the optical semiconductor device (LED) array substrate and the like.

The light reflecting layer or the light reflecting plate is integrated or laminated with the sheet metal back chassis, and thus a light reflecting layer formed by bonding and laminating a resin foam to an aluminum sheet metal substrate does not need to be produced through separate sheet metal working. The number of components is reduced, and thus not only reduction in weight and thickness of a backlight device and a liquid crystal display is realized, but also the number of production steps and the number of assembly steps are reduced. Meanwhile, a complex reflecting surface shape may be subjected to separate sheet metal working and inserted for integrally forming a light reflecting layer, to thereby form a complex reflecting surface. Further, a support for supporting a light diffusing plate requiring light reflecting property can be formed.

In the present invention, a sheet metal itself is worked, and thus working of a complex shape, which cannot be obtained through sheet metal working by using a sheet metal obtained by bonding and laminating a resin foam to a sheet metal of an aluminum substrate, can be realized. Further, a degree of freedom in design of a sheet metal chassis in a backlight device increases.

The light reflective thermoplastic resin material is not particularly limited as long as it is a light reflecting resin material having heat formability capable of being heat formed into an exact shape of the back chassis. However, a light reflecting resin material having a dynamic storage modulus of about $1 \times 10^6$ to $3 \times 10^8$ MPa at a temperature of 150 to 190° C. is preferred. In particular, a porous material from an amorphous and transparent thermoplastic resin material obtained through stretching or foam obtained therefrom by a supercritical fluid foaming method having a light reflectance of 95% or more is preferred. Examples of the amorphous and transparent thermoplastic resin include a polycarbonate-based resin, a polyester-based resin, and a polypropylene-based resin.

In addition, a thermoplastic resin material containing a polycarbonate-based resin, a polyester-based resin, or a polypropylene-based resin, a white pigment, an antioxidant or a decomposition inhibitor, and a flame retardant and a flame retardant assistant as required and having a light reflectance of about 95 to 99.5% is preferred.

A reflector according to an embodiment is characterized in that the sheet metal back chassis has a rigid reinforcing rib structure on a side surface of the sheet metal back chassis and/or the supporting frame.

Use of such the rigid reinforcing rib structure ensures strength and rigidity for supporting a light diffusing plate or a liquid crystal panel even if a thickness of a sheet metal of a substrate to be used for the back chassis is reduced. Thus, the thickness of an aluminum substrate to be used for the back chassis can be reduced, to thereby allow reduction in weight and thickness of the back chassis.

For a direct type-backlight device, sheet metal working of a sheet metal back chassis realizes formation of a frame structure for holding a light diffusing plate and a plurality of optical films. For a tandem-type backlight device, sheet metal working of a sheet metal back chassis realizes formation of a structure (having a corrugated shape of a saw blade shapes for a light guide plate having a wedged sectional shape) for supporting a light diffusing plate, a plurality of optical films, and a plurality of light guide plates to be inserted between the plurality of light sources. A liquid crystal panel can be laminated and held at the same time as required, and thus a liquid crystal display having reduced weight and thickness can be realized.

As shown in FIG. 8, a reflector according to an embodiment is characterized in that the sheet metal back chassis has a grid-like, groove-like, or corrugated rib structure on a bottom surface thereof. Introduction of such the structure prevents warping or deformation of a light reflecting layer surface or a light reflecting plate surface and ensures not only rigidity reinforcing property but also heat radiation property of the light reflecting layer or the light reflecting plate, to thereby prevent excessive temperature increase. Thus, display unevenness or brightness reduction due to heat generation in a light source electrode section can be prevented.

An invention according to an embodiment is characterized in that the light reflecting layer is a light reflecting plate.

An invention according to an embodiment is characterized in that the light reflecting layer has a pressure-sensitive adhesive applied to one side thereof for enhancing adhesiveness with the sheet metal back chassis.

The pressure-sensitive adhesive to be used is not particularly limited, and a commercially available product may be used by coloring with a black colorant or the like for light shielding as required. Examples thereof include a polyolefin-based pressure-sensitive adhesive, a vinyl acetate-based pressure-sensitive adhesive, an acrylic pressure-sensitive adhesive, a latex-based pressure-sensitive adhesive such as SBR, an epoxy-based pressure-sensitive adhesive, a polyester-based pressure-sensitive adhesive, a cyanoacrylate-based pressure-sensitive adhesive, a styrene/acrylic acid-based pressure-sensitive adhesive, and a urethane-based pressure-sensitive adhesive. Of those, from viewpoints of heat resistance and adhesiveness with a metal substrate, a preferred example of the pressure-sensitive adhesive is an acrylic pressure-sensitive adhesive such as: BPS5213, BPS5375, BPS5513, or BPS1109, available from Toyo Ink Mfg. Co., Ltd.; or CAT-1300S, available from Teikoku Printing Inks Mfg. Co., Ltd.

An application method is not particularly limited, and examples thereof include a gravure roll method, a dye coating method, a screen printing method, a knife coating method, and a spray coating method.

A reflector according to an embodiment is characterized in that the light reflecting layer is a light reflecting coat applied to a sheet metal substrate in advance. Light reflecting paint is not particularly limited as long as it is paint containing a white pigment. The light reflecting paint may be powder paint or liquid paint but preferably has a light reflectance of 95% or more. A sheet metal material having a coat formed thereon by applying such a light reflecting paint on a metal substrate such as a stainless steel material, an aluminum substrate, or an aluminum alloy substrate in advance is already commercially available, and sheet metal working of such a sheet metal material can provide a modularized reflector of the present invention. Examples of the sheet metal material include: an aluminum alloy heat dissipation plate "ST60", available from Showa Denko K.K.; a high reflecting aluminum coated material "Fuscoat R crystal" series, available from Furukawa Electric Co., Ltd. Those sheet metal materials may preferably be used.

A reflector according to an embodiment is characterized in that the light reflecting layer employs a porous material obtained from an amorphous and transparent thermoplastic resin material through stretching or a foam obtained therefrom by a supercritical fluid foaming method, and has a light reflectance of 95% or more.

The porous material or the foam obtained by the supercritical fluid foaming method preferably has excellent heat formability, and allows easy formation of a light reflecting layer on a back chassis by a vacuum forming method or a vacuum laminate forming method. Examples of a thermoplastic resin capable of being heat formed include a polypropylene-based resin and a polyester-based resin each having a crystallization rate of about several minutes. An example of the amorphous and transparent resin to be used for obtaining a porous material through stretching is a transparent resin containing a small amount of an inorganic particulate substance added as a nucleator for suppressing crystallization due to copolymerization and forming a void through stretching.

Examples of the inorganic particulate substance include inorganic fillers such as calcium carbonate, calcium sulfate, barium sulfate, talc, silica, and alumina. An addition amount of the inorganic particulate substance is generally about 0.1 to 20 mass %. A resin containing the inorganic filler is molded into a film or sheet by a general extrusion molding method, and the obtained film or sheet is stretched, to thereby provide a porous material.

An example of a method of producing the stretched porous material by using a PET-based resin involves: mixing about 15 mass % of barium sulfate with the PET-based resin; melting, kneading, and extruding the mixture at a temperature of 260 to 280° C. by using a melt kneading extruder to form pellets; producing an amorphous sheet by an extrusion sheet molding method at a cylinder temperature of 280 to 300° C. and a roll temperature of 10 to 60° C.; stretching and orientating the obtained sheet by using a biaxial stretching machine into 2 to 5 times the original size at a temperature of 70 to 120° C. and crystallizing the resultant in a first step, and stretching and orientating the resultant sheet into 3 to 6×3 to 6 times the original size at a temperature of 70 to 120° C. and crystallizing the resultant in a second step; and conducting heat fixing at a temperature of 180 to 230° C. for obtaining a light reflecting sheet of porous material.

In the foam obtained by the supercritical fluid foaming method, a cell having an average foaming cell diameter of 10 μm is formed in advance by using a polypropylene-based resin or a polyester-based resin, and then heat forming and crystallization are conducted at the same time to retain a foamed structure. Thus, formation of a predetermined shape is realized through heat forming while degradation in light reflecting property due to a foamed structure is suppressed.

Examples of a method of producing the foam by the supercritical fluid foaming method include a batch type and a continuous extrusion type. The batch type provides a foam by, for example: blowing a supercritical gas fluid (carbon dioxide or nitrogen) to a thermoplastic resin sheet at room temperature in an autoclave; heating or pressurizing to a temperature or a pressure of a supercritical point of the gas or higher; impregnating inside of the thermoplastic resin sheet with the supercritical fluid gas; and cooling or reducing pressure. For example, JP patent No. 2925745 discloses a method of accelerating impregnation of inside of a thermoplastic resin sheet with a supercritical gas fluid by allowing an organic solvent such as acetone to be present, taking out the resultant from an autoclave, and subjecting the resultant to heat treatment, to thereby obtain a foam.

For example, there is proposed, in JP-A-08-11190, JP-A-10-76560, or the like, a method of obtaining a foam including the steps of: melting and plasticizing a thermoplastic resin in a first barrel of a tandem-type extruder, and injecting a supercritical gas fluid to mix, disperse, and impregnate the resin with the supercritical gas fluid; reducing a temperature of a molten resin while a pressurized state is maintained in a second barrel; forming many cells through rapid pressure reduction; and controlling foaming for controlling a cell diameter. Any of those methods may preferably be used in accordance with properties of a thermoplastic resin to be used.

A reflector according to an embodiment is characterized in that the light reflecting layer employs a porous material obtained from a polycarbonate-based resin, a polyester-based resin, or a polypropylene-based resin through stretching or a foam obtained therefrom by the supercritical fluid foaming method, and has a light reflectance of 95% or more.

The porous material may be obtained by: mixing a small amount of an inorganic particulate substance as a nucleator for forming a void through stretching with a polycarbonate-based resin, a polyester-based resin, or a polypropylene-based resin; and melt kneading the resultant. The mixing and melt kneading may be conducted through a method generally used such as a method using a ribbon blender, a Henschel mixer (trade name), a Banbury mixer, a drum tumbler mixer, a single-screw extruder, a twin-screw extruder, a co-kneader, a multi-screw extruder, or the like. A heating temperature in melt kneading is generally selected within a range of 240 to 320° C. The thus-obtained thermoplastic resin composition may be formed into a film or sheet by a known extrusion molding method. The obtained film or sheet is stretched into a porous material, to thereby form a light reflecting layer or a light reflecting plate (light reflecting sheet) having an arbitrary shape such as a flat shape, a corrugated shape, or a box shape by various heat forming methods. The light reflecting layer or the light reflecting sheet can be used with a thickness within a range of about 50 μm to 1.5 mm, and preferably about 0.2 to 1.5 mm. In applications of the present invention, the light reflecting layer or the light reflecting sheet can be used preferably with a thickness within a range of 0.3 to 0.8 mm. A thickness of less than 50 μm increases light leak in light reflection and causes brightness reduction, and a thickness of more than 1.5 mm reduces heat formability.

Examples of the inorganic particulate substance include inorganic fillers such as calcium carbonate, calcium sulfate, barium sulfate, talc, silica, and alumina. A mixing amount of the inorganic particulate substance is generally about 0.1 to 20 mass %.

Examples of a porous material obtained by forming a void through stretching include: E60L, available from Toray Industries, Inc. as a polyethylene terephthalate resin-based porous material; and White Refstar, available from Mitsui Chemicals, Inc. as a polypropylene resin-based porous material.

An example of the foam obtained by a supercritical foaming method is MC-PET available from Furukawa Electric Co., Ltd.

In the case where the film or sheet of the foam lacks heat formability due to a designed shape of a back chassis, the film or sheet may be formed into a predetermined shape through cutting, perforating, folding, or the like, and the film or sheet may be laminated and arranged on a reflecting surface inside a lamp house. A fixing method preferably employs a method using a two-sided pressure-sensitive tape. A preferred example of the two-sided pressure-sensitive tape is a bonding tape for a VHR acryl foamed structure Y-4950, available from Sumitomo 3M, Ltd.

A reflector according to an embodiment is characterized in that the light reflective thermoplastic resin material is a thermoplastic resin composition containing a polycarbonate-based resin, a polyester-based resin, or a polypropylene-based resin as a matrix resin component, 8 to 50 mass % of a white pigment, 0.1 to 5 mass % of an antioxidant or a decomposition inhibitor, and 0.1 to 5 mass % of a flame retardant and a flame retardant assistant in total as required. Use of such the thermoplastic resin composition provides a light reflecting layer or a light reflecting plate to be obtained having excellent reflectance, light shielding property, and light resistance. A content of the white pigment within the above-mentioned range provides excellent light shielding property and reflectance, and mixing of the white pigment with the polycarbonate-based resin, the polyester-based resin, or the polypropylene-based resin can be conducted without problems.

The polycarbonate-based resin as a matrix resin component can be obtained by a method disclosed in JP-A-2004-91567. That is, a polycarbonate-based resin as a matrix resin component can be produced, for example, in a solvent such as methylene chloride and in the presence of a known acid acceptor or a molecular weight modifier by reacting a dihydric phenol and a carbonate precursor such as phosgene, or through an ester exchange reaction of a dihydric phenol and a carbonate precursor such as diphenyl carbonate. The dihydric phenol is not particularly limited, and may be a homopolymer using one kind of dihydric phenol or a copolymer using two or more kinds of dihydric phenols. Further, the dihydric phenol may be a thermoplastic random polycarbonate obtained by using a polyfunctional aromatic compound and a dihydric phenol in combination.

Examples of the polyester-based resin include: a polyethylene terephthalate (PET) resin; a copolymer of terephthalic acid and isophthalic acid; a polymer of terephthalic acid and 1,3-propanediol or 1,4-butanediol; and a polybutylene terephthalate (PBT) resin. Examples of the polypropylene-based resin include: a homopolymer of propylene; and a copolymer of propylene and one or more comonomers selected from ethylene and olefins each having 4 or more carbon atoms such as olefins having 4 to 20 carbon atoms.

Various substances may be used as a white pigment, and specific examples of the white pigment include titanium oxide, zinc oxide, lithopone, zinc sulfide, and lead white. Of those, titanium oxide is preferred because of excellent coloring power. Titanium oxide may have a rutile structure or an anatase structure, but a rutile structure is preferably used because of excellent heat stability and weatherability. Titanium oxide is preferably subjected to surface treatment with various surface treatment agents such as hydrated alumina, silica, and zinc.

In mixing of the white pigment such as titanium oxide into the polycarbonate-based resin, a decomposition inhibitor must be mixed for suppressing decomposition or degradation of the resin due to the white pigment. The decomposition inhibitor is mixed in an amount of 0.1 to 5 mass % with respect to a total amount of the composition. A mixing amount of the decomposition inhibitor within the above range provides a sufficient effect of suppressing decomposition or degradation of the resin and causes no mold deposits. Organosiloxane is preferably used as the decomposition inhibitor, and examples of the organosiloxane include: alkyl hydrogen silicone; and alkoxy silicone having a reactive group such as a methoxy group or an ethoxy group. Examples of the alkyl hydrogen silicone include methyl hydrogen silicone and ethyl hydrogen silicone, and examples of the alkoxy silicone include methoxy silicone and ethoxy silicone.

The flame retardant to be used as required may employ a known substance such as an organometallic salt compound, inorganic silicic acid and its silicate compound, a phosphate-based compound, a bromine-based compound, a triazine-based compound, or a polyorganosiloxane-based compound. As the flame retardant assistant, a Teflon resin may be used as a dripping inhibitor. A total mixing amount of the flame retardant and the flame retardant assistant is 0.1 to 5 mass %, and preferably 1 to 4 mass % with respect to a total amount of the composition.

The thermoplastic resin may be obtained by: mixing predetermined amounts of the polycarbonate resin, the polyester-based resin, or the polypropylene-based resin, the white pigment, the antioxidant or the decomposition inhibitor, and the flame retardant and the flame retardant assistant as required; and melt kneading the mixture. The mixing and melt kneading may be conducted through a method generally used such as a method using a ribbon blender, a Henschel mixer (trade name), a Banbury mixer, a drum tumbler mixer, a single-screw extruder, a twin-screw extruder, a co-kneader, a multi-screw extruder, or the like. A heating temperature in melt kneading is generally selected within a range of 240 to 320° C. The thus-obtained thermoplastic resin composition may be molded into a film or sheet by a known extrusion molding method. The obtained film or sheet is formed into a light reflecting layer or a light reflecting plate (light reflecting sheet) having an arbitrary shape such as a flat shape, a corrugated shape, or a box shape by various heat forming methods. The light reflecting layer or the light reflecting sheet can be used with a thickness within a range of about 50 μm to 1.5 mm, and preferably about 0.2 to 1.5 mm. In applications of the present invention, the light reflecting layer or the light reflecting sheet can be used preferably with a thickness within a range of 0.3 to 0.8 mm. A thickness of less than 50 μm increases light leak in light reflection and causes brightness reduction, and a thickness of more than 1.5 mm reduces heat formability.

A specific example of the heat forming method is a method involving: heating the obtained sheet; and molding the sheet under vacuum and/or at a pressure of pressurized air. The heating may be conducted on one side or both sides of the sheet, and the sheet may be brought into direct contact with a heat source for heating. A sheet heating temperature (i.e., sheet surface temperature) during heat forming is 160 to 200° C., and preferably 170 to 200° C., and an average developing ratio is 1.2 to 2 times, and preferably 1.2 to 1.8 times.

A heating temperature of lower than 150° C. may inhibit uniform forming, and a heating temperature of higher than 200° C. is likely to cause formation of bubbles in the sheet. The heat forming method is not particularly limited, but examples thereof include a simple vacuum forming method, a drape forming method, a matched die method, a pressure bubble plug assist vacuum forming method, a plug assist method, a vacuum snap back method, a pressure bubble vacuum snap back method, air slip forming, trapped sheet contact heating/pressure forming, and a simple pressure forming method. A pressure during forming is preferably 98 kPaG or less for the vacuum forming method and 294 to 784 kPaG for the pressure forming method. The vacuum forming method and the pressure forming method may be conducted in combination. The heat forming method allows formation of a shape in accordance with the type and number of light source and a shape allowing uniform areal reflectance. The sheet or the molded product has excellent heat resistance and flame retardance, and high light reflectance.

The sheet to be used during the heat forming is preferably predried, and is capable of preventing a bubble formation phenomenon due to moisture absorption. Appropriate drying conditions in this case are 120 to 140° C., and for 2 to 10 hours.

A reflector according to an embodiment is characterized in that the light reflective thermoplastic resin material employs a polycarbonate/polyorganosiloxane copolymer (hereinafter, referred to as a PC-PDMS copolymer) as a matrix resin component. The copolymer is a block copolymer formed of a polycarbonate part and a polyorganosiloxane part, and has a viscosity average molecular weight of preferably 10,000 to 40,000, and more preferably 12,000 to 35,000. The PC-PDMS copolymer may be obtained by a method described in JP-A-2004-91567, for example. That is, the PC-PDMS copolymer may be produced by: dissolving a polycarbonate oligomer (hereinafter, referred to as a PC oligomer) produced in advance and forming the polycarbonate part, and polyorganosiloxane forming the polyorganosiloxane part and having a reactive group at a terminal position (polydialkylsiloxane such as polydimethylsiloxane (PDMS) or polydiethylsiloxane, or polymethylphenylsiloxane, for example) in a solvent such as methylene chloride, chlorobenzene, or chloroform; adding a sodium hydroxide aqueous solution of bisphenol to the solution; using triethylamine, trimethylbenzylammonium chloride, or the like as a catalyst; and conducting an interfacial polycondensation reaction. Further, a PC-PDMS copolymer produced by a method descried in JP-B-S44-30105 or a method described in JP-B-S45-20510 may be used.

The copolymer is selected as the matrix resin component. Thus, the light reflective thermoplastic resin to be obtained may realize a flame retardance level of V-0 in accordance with UL94 standards regarding flame retardance with a sheet thickness of 1 mm or less without mixing a phosphorus-based flame retardant.

A reflector according to an embodiment is characterized in that: the matrix resin component is a polymer alloy formed of polycarbonate and an acrylic resin; and a mixed ratio of the polymer alloy (polycarbonate resin: acrylic resin) is 99:1 to 50:50 in mass ratio.

Selection of such the polymer alloy as the matrix resin component allows further improvement in light reflectance and light resistance than those of a light reflective thermoplastic resin material employing a polycarbonate resin alone as a matrix resin component. A ratio of the acrylic resin of less than 1 provides similar light reflectance and light resistance, and a ratio of the acrylic resin of more than 50 reduces heat resistance and causes problems in backlight device applications.

The polymer alloy can be obtained by, for example: blendingpredetermined amounts of a polycarbonate resin and an acrylic resin; and melt kneading the resultant. The blending and the melt kneading may be conducted by a method generally used such as a method using a ribbon blender, a Henschel mixer (trade name), a Banbury mixer, a drum tumbler mixer, a single-screw extruder, a twin-screw extruder, a co-kneader, a multi-screw extruder, or the like. A heating temperature in melt kneading is generally selected within a range of 240 to 320° C. The light reflective thermoplastic resin material using the polymer alloy as a matrix resin component may be molded into a film or sheet by a known extrusion molding method. The obtained film or sheet is formed into a light reflecting plate (light reflecting sheet) having an arbitrary shape such as a flat shape, a corrugated shape, or a box shape by various heat forming methods for heat forming. At this time, a pressure-sensitive adhesive 30 (as shown in FIG. 1) is preferably applied to one side of the sheet for enhancing adhesiveness with the aluminum substrate of the back chassis.

A reflector according to an embodiment is characterized in that the light reflecting layer or the light reflecting plate (light reflecting sheet) has a light shielding layer formed on a back surface and a light resistant coating layer formed on a front surface as required. Use of a sheet having such a structure allows absorption of light (orange light) from a light source transmitting the sheet and leaking and improvement in product quality during light emission. The light shielding layer to be used contains acrylic resin-based paint, an adhesive, a pressure-sensitive adhesive, and a black and/or blue pigment or dye. A thickness of the light shielding layer varies depending on the kind and mixed concentration of pigment, but is preferably about 1 to 50 μm. A light shielding sheet, and the light reflecting layer or light-reflecting sheet may be formed into a multilayer during sheet forming.

A reflector according to an embodiment is characterized in that the light reflecting layer or the light reflecting plate obtained by forming the light reflective thermoplastic resin material into a sheet is integrated and laminated with the sheet metal back chassis serving as a supporting substrate by a vacuum pressure forming method, a heat forming method, or a vacuum laminate forming method.

Such integration requires no use of an aluminum sheet metal for a light reflecting plate supporting substrate as shown in FIG. 9, and allows reduction in weight and simplified assembly steps.

The vacuum pressure forming method, the heat forming method, or the vacuum laminate forming method may be conducted in accordance with the operation method described above. The sheet to be used during heat forming is preferably predried, thereby being capable of preventing a bubble formation phenomenon due to moisture absorption. Appropriate drying conditions in this case include 120 to 140° C. for 2 to 10 hours.

A reflector according to an embodiment is characterized in that: the light reflecting layer or light reflecting plate light reflecting sheet) is separately heat formed into a shape of a back chassis; and the obtained molded product is laminated and integrated with the back chassis. Further, the reflector according to an embodiment is characterized in that the light reflecting layer is integrated with the back chassis by inserting and by heat forming the back chassis during forming of the light reflecting layer or the light reflecting plate by a vacuum laminate method. Such integration allows the back chassis itself to serve as a mold, and requires no separate production of a mold for heat forming. Further, the assembly involves simple steps, and warping or deformation of the light reflecting layer or the light reflecting plate may be suppressed.

An example of the vacuum laminate method is a heat forming method by using devices and steps shown in FIGS. 1 to 8 of JP-A-2002-067137.

That is, as shown in FIG. 1 of JP-A-2002-067137, a back chassis is set inside a lower forming chamber and a light reflecting lamp is clamped above the back chassis. As shown in FIG. 2 thereof, upper and lower forming chambers are closed for vacuum sucking. Then, as shown in FIG. 3 thereof, the sheet is heated on one side by using a near infrared heater in the upper chamber, and a sheet surface temperature is adjusted to 180° C. Next, as shown in FIG. 4 thereof, a lower table having the back chassis placed thereon is elevated, and the back chassis is laminated with the light reflecting sheet. Then, as shown in FIGS. 5 and 6 thereof, pressurized air is blown into the upper chamber to bring the back chassis in closer contact. Finally, as shown in FIG. 7 thereof, a sheet section not used in lamination is cut out and a molded product having the back chassis and the light reflecting sheet is taken out.

A reflector according to an embodiment is characterized in that a light source electrode terminal cover is white silicone rubber having a function for preventing light leak from a through-hole of a light source electrode terminal supporting section. The white silicone rubber may preferably employ known rubber used for an electrode terminal cover, but preferably employs rubber exhibiting flame retardance and having a degree of whiteness (reflectance) as high as possible.

A backlight device according to an embodiment is obtained by arranging a light diffusing plate, a plurality of light guide plates as required, and a plurality of optical films on the reflector according to any one of the embodiments, and fitting and fixing the whole with a front chassis. A backlight device having reduced weight can be obtained through reduction in number of components, reduction in thickness of the back chassis, and the like.

A liquid crystal display according to an embodiment is obtained by arranging a light diffusing plate, a light guide plate as required, an optical film, and a liquid crystal panel on the reflector according to any one of the embodiments, and fitting and fixing the whole with a front chassis. A liquid crystal display having reduced weight can be obtained through reduction in number of components, reduction in thickness of the back chassis, and the like.

EXAMPLES

Next, the present invention will be described by using examples.

Example 1

A back chassis (1) as shown in FIG. 1 having a reinforcing rib (2) on a back surface thereof, and having a light source supporting section, a through-hole for 31 extracting a light source electrode terminal, and a frame (not shown) for supporting a light diffusing plate and a plurality of optical films integrally formed was produced through sheet metal working of an aluminum sheet metal.

Next, 79.4 mass % of a polycarbonate resin (FN1900A, available from Idemitsu Kosan Co., Ltd.), 20 mass % of titanium oxide (PC3, available from Ishihara Industry Co., Ltd.) as a white pigment, and 0.6 mass % of methyl hydrogen polysiloxane (SH1107, available from Dow Corning Toray Co., Ltd.) as a decomposition inhibitor were dry blended, and the obtained mixture was kneaded at a cylinder temperature of 280° C. by using a twin-screw extruder attached to vent (TEM-35, manufactured by Toshiba Machine Co., Ltd.), to thereby obtain pellets of a polycarbonate resin composition. The obtained pellets were dried at 140° C. for 4 hours in a hot air oven. Then, the dried pellets were extruded in a horizontal direction at a cylinder temperature of 250 to 260° C. and a die temperature of 240° C. by using a single-screw extruder having a coat hanger die with a diameter of 65 cm and a width of 60 cm, and subjected to sheet forming in a three vertical chill roll system, to thereby obtain a sheet having a thickness of 1 mm. Both sides of the sheet were heated to 180° C. in advance, and the sheet was subjected to vacuum forming at a pressure of 29.4 kPa by using the back chassis as a mold, to thereby obtain a reflector (a) having a light reflecting sheet (3) and the back chassis (1) integrally formed as shown in FIG. 1. A direct type-backlight device was produced by using the obtained reflector (a) and arranging a light diffusing plate (5), light diffusing films (6), and a prism sheet (7) as shown in FIG. 4. A liquid crystal display as shown in FIG. 7 was produced by arranging a liquid crystal panel (9) on the backlight device and fitting and fixing the liquid crystal panel (9) with a front chassis (8). Note that in the case where a cold cathode tube of a light source (4) was attached to a light source electrode terminal through-hole, the light source electrode terminal through-hole was sealed with a cold cathode tube terminal cover (white silicone, available from Dow Corning Toray Co., Ltd.), to thereby prevent light leak to the back surface of the back chassis.

The reflector does not need to be produced through separate sheet metal working by using a light reflecting plate formed by bonding and laminating a resin foam to an aluminum sheet metal substrate, and the number of components were reduced. Thus, reduction in weight and thickness of the backlight device and the liquid crystal display was realized, and the numbers of production steps and assembly steps were reduced.

Example 2

A reflector (b) as shown in FIG. 2 was produced in accordance with Example 1 except that: a back chassis as shown in FIG. 2 produced through sheet metal working of an aluminum sheet metal, having a reinforcing rib on a back surface, having a corrugated reflecting surface, and having a light source supporting section, a through-hole for extracting a light source electrode terminal, and a frame (not shown) for supporting a light diffusing plate and a plurality of optical films integrally formed was used; and pressure forming was conducted at a pressure of 588 kPaG. A direct type-backlight device was produced by using the obtained reflector (b) and arranging a light diffusing plate (5), light diffusing films (6), and a prism sheet (7) as shown in FIG. 5.

The number of components was reduced. As a result, not only reduction in weight and thickness of the backlight device and the liquid crystal display was realized, but also the numbers of production steps and assembly steps were reduced.

Example 3

A reflector (c) as shown in FIG. 3 was produced in accordance with Example 1 except that a tandem-type back chassis as shown in FIG. 3 produced through sheet metal working of an aluminum sheet metal was used; and insert molding was conducted. A direct type tandem-type backlight device was produced by using the obtained reflector (c) and arranging a light guide plate (10), a light diffusing plate (5), light diffusing films (6), and a prism sheet (7) as shown in FIG. 6.

The light reflecting plate and the sheet metal back chassis were integrated or laminated, and the reflector does not need to be produced through separate sheet metal working by using a light reflecting plate formed by bonding and laminating a resin foam to an aluminum sheet metal substrate, and the number of components was reduced. Thus, reduction in weight and thickness of the backlight device and the liquid crystal display apparatus was realized, and the numbers of production steps and assembly steps were reduced.

Example 4

The reflector (a) as shown in FIG. 1 was produced in accordance with Example 1 except that a resin composition containing 68.7 mass % of a PC-PDMS copolymer (Tarflon FC1700, available from Idemitsu Kosan Co., Ltd., Mv=17,800, PDMS content of 3.7 mass %), 30 mass % of titanium oxide (PF726, available from Ishihara Industry Co., Ltd., rutile structure) as a white pigment, and 0.3 mass % of PTFE (Algoflon F5) and 1 mass % of BY16-161 (silicone having a methoxysilyl group in which a methoxy group is bonded to a silicon atom through divalent hydrocarbon, available from Dow Corning Toray Co., Ltd.) as decomposition inhibitors was used as a light reflective thermoplastic resin material. A direct type-backlight device as shown in FIG. 4 was produced in accordance with Example 1 by using the obtained reflector (a), and a liquid crystal display as shown in FIG. 7 was produced by arranging a liquid crystal panel on the backlight device.

Example 5

The reflector (b) as shown in FIG. 2 was produced in accordance with Example 2 except that the resin composition described in Example 4 was used as a light reflective thermoplastic resin material. A backlight device as shown in FIG. 5 was produced in accordance with Example 2 by using the obtained reflector (b).

Example 6

The reflector (3) as shown in FIG. 3 was produced in accordance with Example 3 except that the resin composition described in Example 4 was used as a light reflective thermoplastic resin material. A backlight device as shown in FIG. 6 was produced in accordance with Example 3 by using the obtained reflector (3).

Example 7

The reflector (a) as shown in FIG. 1 was produced in accordance with Example 1 except that a resin composition containing 54 mass % of a polycarbonate resin (FN2200A, available from Idemitsu Kosan Co., Ltd., viscosity average molecular weight of 22,300), 15 mass % of an acrylic resin (Sumipex HT55X, available from Sumitomo Chemical Co., Ltd.), 30 mass % of titanium oxide (PF726, available from Ishihara Industry Co., Ltd., rutile structure) as a white pigment, and 1 mass % of BY16-161 (silicone having a methoxysilyl group in which a methoxy group is bonded to a silicon atom through divalent hydrocarbon, available from Dow Corning Toray Co., Ltd.) as a decomposition inhibitor was used as a light reflective thermoplastic resin material. A direct type-backlight device as shown in FIG. 4 was produced in accordance with Example 1 by using the obtained reflector (a), and a liquid crystal display as shown in FIG. 7 was produced by arranging a liquid crystal panel on the backlight device.

Example 8

A back chassis (17) as shown in FIG. 10 having a support (15) for supporting an LED array substrate (16) and an LED light source extracting hole was produced through sheet metal working of an aluminum sheet metal.

Next, vacuum forming was conducted at a pressure of 29.4 kPa and a preheating temperature of 155° C. by using the back chassis as a mold and by using a stretched porous material of White Refstar (available from Mitsui Chemicals, Inc.) as a light reflective thermoplastic resin material prepared by applying a black pressure-sensitive adhesive (BPS5513, available from Toyo Ink Mfg. Co., Ltd.) on a reflecting back surface by a screen printing method. Thus, a reflector as shown in FIG. 10 having a light reflecting layer (19) of the foam and the back chassis (17) integrally formed was produced. An LED light source extracting hole was formed using the obtained reflector by punching, and an LED light source was set as shown in FIG. 11. A light shielding layer (21) and transparent plate (22) were arranged directly above the LED light source, and then a light diffusing plate (5), light diffusing films (6), and a prism sheet (7) were arranged, to thereby produce a direct type-backlight device as shown in FIG. 11 having a light emitting device (LED) as a light source.

Example 9

A direct type-backlight device as shown in FIG. 11 having a light emitting device (LED) as a light source was produced in accordance with Example 8 except that: a foam sheet (MC-PET, available from Furukawa Electric Co., Ltd.) obtained by a foaming method using a supercritical fluid was used as a light reflecting layer; and a preheating temperature during vacuum forming was changed to 220° C.

Example 10

A direct type-backlight device as shown in FIG. 11 having a light emitting device (LED) as a light source was produced in accordance with Example 8 except that: a PET stretched porous sheet (E60L, available from Toray Industries, Ltd.) having light reflectance was laminated by working into a box shape for covering a reflecting surface inside a lamp house through cutting, punching, and perforating; and the resultant was fixed by using a two-sided pressure-sensitive tape (bonding tape for VHR acryl foamed structure, Y-4950, available from Sumitomo 3M, Ltd.).

Example 11

A direct type-backlight device as shown in FIG. 11 having a light emitting device (LED) as a light source was produced by using an aluminum sheet metal material (Fuscoat Crystal S, available from Furukawa Electric Co., Ltd.) having a light reflecting coat through sheet metal working.

Example 12

A direct type-backlight device as shown in FIG. 4 was produced in accordance with Example 4 except that a resin composition containing 47.9 mass % of a PC-PDMS copolymer (Tarflon FC1700, available from Idemitsu Kosan Co., Ltd., Mv=17,800, PDMS content of 3.7 mass %), 50 mass % of titanium oxide (PF740, available from Ishihara Industry Co., Ltd., rutile structure) as a white pigment, and 0.3 mass % of PTFE (CD076, available from Asahi Glass Co., Ltd.) and 1.5 mass % of BY16-161 (available from Dow Corning Toray Co., Ltd.) as decomposition inhibitor were used as a light reflective thermoplastic resin material, and a liquid crystal display apparatus as shown in FIG. 7 was produced by arranging a liquid crystal panel on the backlight device.

INDUSTRIAL APPLICABILITY

The present invention is capable of realizing a reflector having sufficient strength and rigidity for supporting a liquid crystal panel and having a chassis function by: integrally forming a light source supporting section, a through-hole or groove for extracting a light source electrode terminal, a frame for supporting a light diffusing plate, a plurality of optical films, and the like, and a light diffusing plate support as required on a sheet metal back chassis through sheet metal working; and integrating or laminating the sheet metal back chassis, and a light reflecting layer formed of a molded product of a light reflective thermoplastic resin material formed into a shape for covering the sheet metal back chassis. Thus, a backlight device and a liquid crystal display apparatus each having a reduced number of components, a reduced number of assembly steps, and reduced weight and thickness can be obtained.

The invention claimed is:

1. A reflector, comprising:
a sheet metal back chassis which includes a light source supporting section, a through-hole or groove for extracting a light source electrode terminal, a frame for supporting a light diffusing plate and an optical film, and a light diffusing plate support which are integrally formed in the sheet metal back chassis as a single metal-worked sheet metal unit; and
a light reflecting layer made of a light reflective thermoplastic resin material which is heat formed onto an inside surface of the sheet metal back chassis such that the sheet metal back chassis and the light reflecting layer are modularized into a single unit by integrating, the sheet metal back chassis serving as a supporting substrate, and the integrating performed by inserting the sheet metal back chassis and by heat forming the light reflecting layer by a vacuum pressure forming method, a heat forming method, or a vacuum laminate forming method.

2. The reflector according to claim 1, wherein the sheet metal back chassis has a rigid reinforcing rib structure on a side surface of the sheet metal back chassis and/or the supporting frame.

3. The reflector according to claim 1, wherein the sheet metal back chassis has a lattice-like, groove-like, or corrugated rib structure serving as a rigid reinforcer and/or radial fin on a back surface of the light reflecting layer.

4. The reflector according to claim 1, wherein the light reflecting layer is a light reflecting plate.

5. The reflector according to claim 1, wherein the light reflecting layer has a pressure-sensitive adhesive applied to one side.

6. The reflector according to claim 1, wherein the light reflective thermoplastic resin material is a porous material obtained from an amorphous and transparent thermoplastic resin material through stretching or a foam obtained therefrom by a supercritical fluid foaming method, and has a light reflectance of 95% or more.

7. The reflector according to claim 1, wherein the light reflective thermoplastic resin material is a porous material obtained from a polycarbonate-based resin, a polyester-based resin, or a polypropylene-based resin through stretching or a foam obtained therefrom by a supercritical fluid foaming method, and has a light reflectance of 95% or more.

8. The reflector according to claim 7, wherein:
the polycarbonate-based resin comprises a polycarbonate/polyorganosiloxane copolymer;
the polyester-based resin comprises polyethylene terephthalate, polybutylene terephthalate, a terephthalic acid/isophthalic acid copolymer, or a terephthalic acid/1,3-propanediol or 1,4-butanediol polymer; and
the polypropylene-based resin comprises a propylene homopolymer, or a copolymer of propylene, and ethylene or an olefin having 4 or more carbon atoms.

9. The reflector according to claim 7, wherein:
the polycarbonate-based resin comprises a polymer alloy formed of a polycarbonate resin and an acrylic resin; and
a mixed ratio (polycarbonate resin: acrylic resin) of the polymer alloy is 99:1 to 50:50 in mass ratio.

10. The reflector according to claim 1, wherein the light reflective thermoplastic resin material is a thermoplastic resin composition containing: a polycarbonate-based resin, a polyester-based resin, or a polypropylene-based resin as a matrix resin component; 8 to 50 mass % of a white pigment; 0.1 to 5 mass % of an antioxidant or a decomposition inhibitor; and 0.1 to 5 mass % of a flame retardant and a flame retardant assistant in total as required.

11. The reflector according to claim 1, wherein the light reflecting layer has a light shielding layer formed on a back surface and a light resistant coating layer formed on a surface as required.

12. A backlight device, wherein the reflector according to claim 1 is arranged with a light diffusing plate, a light guide plate as required, and an optical film, and the whole is fitted and fixed with a front chassis.

13. A liquid crystal display, wherein the reflector according to claim 1 is arranged with a light diffusing plate, a light guide plate as required, an optical film, and a liquid crystal panel, and the whole is fitted and fixed with a front chassis.

14. The reflector according to claim 9, wherein the polycarbonate-based resin comprises a polycarbonate/polyorganosiloxane copolymer; the polyester-based resin comprises polyethylene terephthalate, polybutylene terephthalate, a terephthalic acid /isophthalic acid copolymer, or a terephthalic acid/1,3-propanediol or 1,4-butanediol polymer; and the polypropylene-based resin comprises a propylene homopolymer, or a copolymer of propylene, and ethylene or an olefin having 4 or more carbon atoms.

* * * * *